STEPHEN D. TUCKER, OF NEW YORK, N. Y.

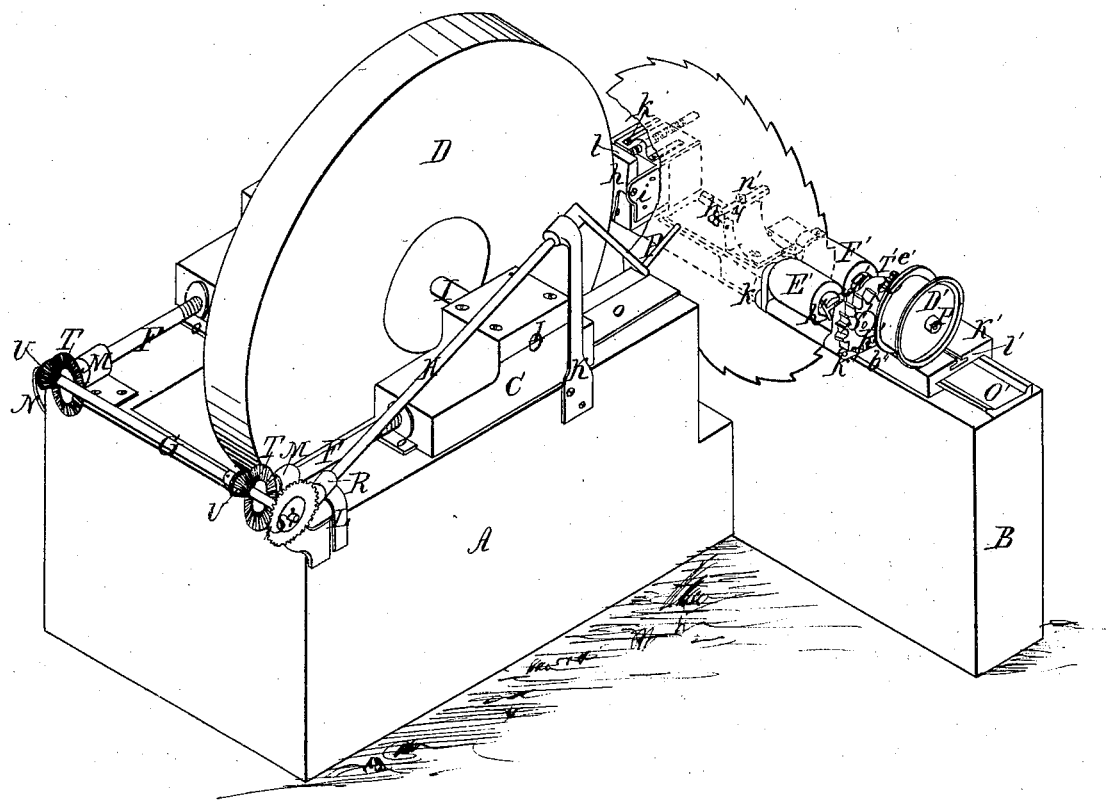

Letters Patent No. 89,448, dated April 27, 1869.

IMPROVEMENT IN MACHINE FOR GRINDING CIRCULAR SAWS.

The Schedule referred to in these Letters Patent and making part of the same.

*To all whom it may concern:*

Be it known that I, STEPHEN D. TUCKER, of the city, county, and State of New York, have invented certain new and useful Improvements in Machines for Grinding Circular Saws; and I do hereby declare the following to be a full, clear, and exact description of the construction and operation of the same, reference being had to the accompanying drawings, in which an isometrical view of the machine is given.

Before the date of my invention, the rotary motion given to the saw was imparted, in these machines, by friction-pulleys or rollers, one of which only was rotated by the driving-mechanism, the other being rotated by the friction of the surface of the saw, against which the roller was pressed by a spring. The motions of the rollers being thus, in a measure, independent of each other, there was no certainty of obtaining a uniform rotation of the saw, nor of grinding it with a true surface.

These difficulties are obviated in my invention by the manner in which the parts holding and controlling the saw are arranged, as will be more fully set out hereafter.

My invention consists in mechanism for holding and controlling the saw in such a manner as to impart a uniform and positive rotation to it during the operation of grinding; and also in mechanism for moving and adjusting the grindstone to and from the face of the saw, in combination with the mechanism for holding and rotating the saw.

To enable others skilled in the art to make and use my invention, I will describe its construction and operation.

The carriage and its mechanism, as well as the grindstone and its adjusting-apparatus, are secured to and supported by the frame A A B.

The journal-blocks C C, which support the ends of the shaft I of the grindstone, are arranged to move on the slides O O, that are secured on the frame.

F F are two screw-rods, which work in screw-holes in the journal-blocks, and are secured to the bevel-gears T T.

These gears mesh with the pinions U U, on the shaft G, and have a uniform motion.

The shaft G is supported by the two brackets N N on the end of the frame; and on the front end of the shaft there is a bevel-gear, S, which meshes with the pinion R, on the inclined shaft H.

This shaft is supported by the standards K L, and has a handle, P, secured to its upper end. As the handle P is turned, the grindstone D is moved either toward or away from the saw, through the medium of the rods E G H, and the gears R S T U.

The grindstone D may be driven by means of a band-wheel, attached to the end of the shaft I.

The adjustable head that holds the rollers E' F', and the arbor q, that supports the saw at its centre, are secured to the carriage K.

The ways O', on which the carriage travels, are secured on the frame B.

The rollers E' F', which impart a rotary motion to and control the saw during the process of grinding, are geared together, and motion is given to these gears S' T' by means of the pulley D', which is secured on the shaft P'.

This pulley is rotated by a belt, driven by a drum of sufficient length to allow for the travel of the carriage.

The roller E' is made movable, with regard to the roller F', to allow for the admission of saws of different thickness; and the means for operating the same consist of the L-shaped lever $i'$, pivoted at $k'$, which forms, at its upper end, a bearing for one end of the shaft R', on which the gear S' is secured, an ear, $g'$, threaded for the passage of a set-screw, $h'$, whose point works against a projection, $g''$, on the stationary bearing $d'$, of the shaft P', and the coil spring on the rod $e'$, which acts on the lower end of the lever $i'$, with a tendency to press the two rollers strongly together, and gripe the saw.

When it is desired to admit or remove a saw, the pressure of the spring is counteracted and the rollers readily separated by means of the set-screw $h'$, which works against the stationary projection $g''$.

The head carrying the rollers is adjusted on the carriage by means of a clamp and screw, which work in a T-shaped slot, $i'$, in the carriage, so that the distance between the centre or bearing of the saw and the rollers can be readily adjusted for saws of different radius.

The arbor $q$ is so constructed that the saw is securely held in place on the pin $p$, while its centre is permitted to advance up to the edge of the grindstone.

The rest, for giving a concave, convex, or parallel surface to the face of the saw, is pivoted at $i$, and is so operated at proper intervals by suitable mechanism acting on the screw $l$, that it is pressed against or withdrawn from the surface of the saw that is interposed between it and the face of the grindstone in a regular and uniform manner, or it remains stationary, as may be required.

The construction of the arbor or bearing, and of the movable rest $h$, is set out at large in the specification and drawings of an application for a patent for similar improvements, filed by me on the 22d of May, 1868, to which reference is made for a more minute description than is here given.

The operation of the machine is as follows:

The stone D is brought up against the face of the saw by turning the handle P. The movable rest $h$ is adjusted to be in line with the face of the roller F', and the coiled spring on the rod $e'$ is compressed, so as to press the rollers E' and F' sufficiently hard against the saw to drive it. Motion is then applied to the several pulleys, which operate the different mechanism.

A positive motion is thus given to the saw at all times and under all circumstances by the geared rollers, while a differential reciprocating motion is given to the carriage travelling on the ways O', and the entire surface of the saw to be ground is brought in contact with the stone.

The arrangement by which the apparatus controls the adjustment of the grindstone is of great advantage in enabling the machine to be controlled and operated by one person.

Having thus fully described my invention,

I claim—

1. A pair of geared rollers, arranged to grasp the saw on opposite sides by a spring pressure, substantially as described, and for the purpose specified.

2. The combination of a pair of geared rollers, for driving and controlling the saw, with a reciprocating carriage, upon which the saw is supported, that moves in a plane parallel to the axis of the grindstone, so as to present the saw to the action of the stone, substantially as described and specified.

3. The arrangement of the mechanism for moving the grindstone to and from the surface of the saw, in combination with the rollers for rotating the saw, and a reciprocating carriage, which holds and moves the saw, substantially as described, and for the purpose specified.

STEPHEN D. TUCKER.

Witnesses:
 THOMAS BELL,
 JOHN COCHRAN.